3,420,039
PURIFICATION OF OIL-CONTAMINATED WATER
Joseph Morris Binder, Pittsburgh, Pa., assignor to Air Products and Chemicals, Inc., Allentown, Pa., a corporation of Delaware
Continuation-in-part of application Ser. No. 592,699, Sept. 26, 1966. This application Aug. 23, 1967, Ser. No. 667,026
U.S. Cl. 55—45          12 Claims
Int. Cl. B01d 19/00

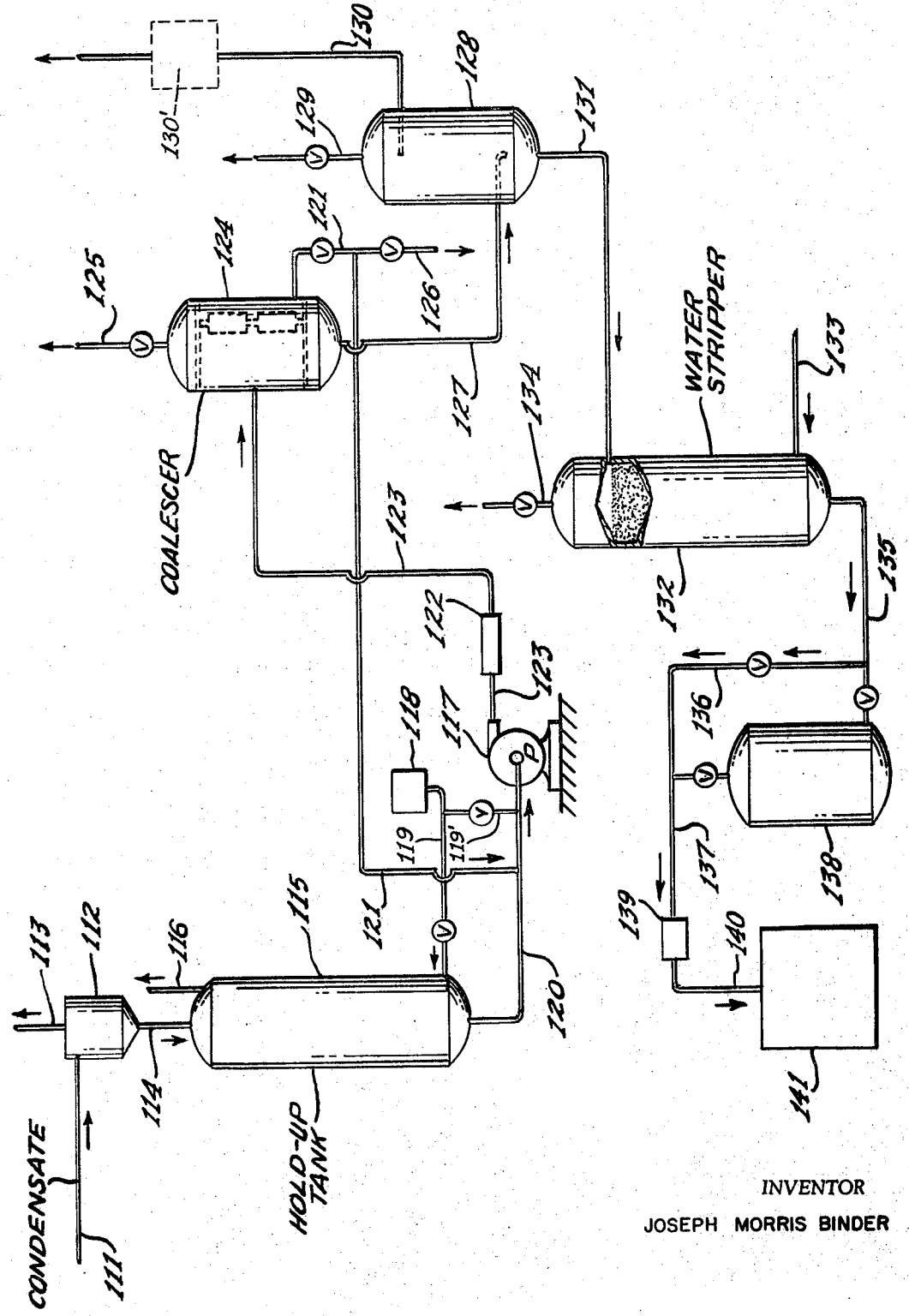

ABSTRACT OF THE DISCLOSURE

Water contaminated with oil heavier than water and with water-soluble components, such as an air compressor condensate in the form of an emulsion containing such contaminants, is treated for recovery of the oil and for removal of such water-soluble components by the successive operations of: deaerating the contaminated condensate emulsion, as needed, in a pre-separating zone for release of excessive amounts of incorporated air; maintaining a surge supply of the relatively air-free emulsion in a hold-up zone; adding a chemical de-emulsifying agent to the degassed fluid condensate; distributing the de-emulsifying agent throughout the condensate to accelerate the resultant reaction; coalescing and filtering the de-emulsified mixture in a coalescing zone to remove any heavy sludge; and separating the remaining liquid in a settling zone into a lower layer comprising recoverable oil and an upper layer comprising water contaminated by said water soluble components. The sludge is separately withdrawn from the coalescing zone and may be recycled, if desired. The contaminated water fraction is treated in an adsorbing zone containing a body of adsorbent material, so as to remove said water-soluble components. In a typical operation according to the invention, a condensate emulsion containing triaryl-phosphate in an amount between about 0.1–0.5 wt. percent is treated with about 0.2 wt. percent of calcium chloride as the de-emulsifier.

---

This application is a continuation-in-part of application Ser. No. 592,699 filed Sept. 26, 1966, and now U.S. Patent No. 3,363,399.

This invention relates to a system for the treatment of oil-contaminated water, for recovery of reusable components and/or conditioning of components to render them acceptable for normal means of waste disposal. The invention is especially directed to the treatment of aqueous mixtures or emulsions in which water is the substantial major component and a contaminant, which is termed oil in its broader sense, is present in relatively small proportion, such as less than one percent.

The invention finds particular advantageous application in the treatment of aqueous emulsions in which the contaminant oil is the heavier component, and is for the most part not readily separable from the lighter water component by ordinary settling, and which to some degree dissolves in the water and forms therewith or therein contaminant compounds which must be removed from the water before the latter is disposed of, either to waste or for some useful application.

Even more particularly, the invention finds advantageous application in the treatment of compressor condensate formed as waste material in industrial processes in order to recover for possible reuse any valuable components of the condensate, for example, lubricating oil; to condition the water component of the condensate for acceptance, in accordance with local anti-pollution laws, by normally available waste disposal means, such as natural bodies of water; and to remove heavier or sludge components for disposal by other suitable means or for possible further treatment for the recovery of additional lubricant.

It is well known that the compression and cooling of air results in condensation of the contained moisture. In the compression of great quantities of air to relatively high pressure, there is a considerable amount of water to be disposed of, and considerable heat is generated in the compressor unit. At the high temperatures developed, ordinary lubricants, such as petroleum oils, are susceptible to decomposition, with resultant carbon residue formation and increased fire hazard.

To overcome the problem of excessive heat, synthetic lubricants are generally employed, thereby appreciably reducing the safety hazard. Synthetic lubricants found to be quite satisfactory in overcoming the problem of heat are triaryl phosphates, one such lubricant being tricresyl phosphate, and similar organic lubricants.

Synthetic lubricant is continuously carried away from the lubricated cylinder and piston surfaces with the formed water, thus necessitating a continuous make-up of lubricant, which may amount to several gallons per day. The synthetic lubricant as well as slight amounts of hydrocarbon lubricants employed in areas adjacent to the compression chamber, but which work their way onto the cylinder walls, are thus incorporated in the body of condensate to be eliminated.

With respect to the disposal of such condensate, it is a common practice to discharge the body of condensate, directly or indirectly, into available natural bodies of water, such as lakes, streams, rivers, bays, etc.

There is a special problem, however, in connection with the matter of condensate disposal when triaryl phosphates are employed as lubricants, since these compounds have been found to be harmful when ingested by wildlife, as will be inevitable. The degree of lubricant contamination in the waste water will depend upon atmospheric humidity during compressor operation, but under normal conditions the condensate will contain about 0.1–0.5 wt. percent of lubricant. The absolute quantity of lubricant to be disposed of is approximately that which is added to the compressor lubricating system, amounting to several gallons per day per plant.

Another additional and secondary adverse effect of condensate contamination by triaryl phosphate type lubricant is that a small amount of the lubricant, about 5–10 p.p.m., dissolves in the condensed water, forming phenolic compounds. Phenols are taste-producing organic compounds which render any water in which they are present unpalatable or otherwise unsuitable for human consumption. Thus, where disposal of the waste water is to areas drained by fresh-water streams, rivers, lakes, wells, etc., which, directly or indirectly, form a source of drinking water, it is imperative that the taste-producing phenolic compounds be removed from the waste water before such disposal. In some areas, contamination limits are set by local regulations.

The various known systems for separating oil-in-water and water-in-oil mixtures are for the most part unsuitable for the decontamination of condensates of the aforementioned type, since the lubricants or oils handled by such systems generally have a specific gravity lower than that of water. The water therefore settles to the bottom of the mixture which has been de-emulsified where it may readily be drawn off and disposed of, with or without other treatment.

In the separation process of this invention there is provision for the treatment of a condensate which is predominantly water containing a trace of highly undesirable, water-soluble contaminant compounds, and which contains less than one-half weight percent of recoverable oil which is heavier than the water. The condensate may also contain extremely minor amounts of oil compounds which are lighter than the water, such as hydrocarbons or petroleum based lubricants, atmospheric dust, rust, scale, etc.

The present invention constitutes an improvement of the system and process disclosed in U.S. Patent No. 3,363,399 of George E. Schmauch and Jack L. Stolz for the purification of oil-contaminated water.

In accordance with the invention, a condensate water emulsion, containing a relatively small amount of heavier lubricant material which dissolves slightly in the water, resulting in the formation of contaminating phenolic compounds, is processed for removal, and possible recovery, of the heavier lubricant material and for removal of the phenols from the resultant waste water. The process involves the reception of intermittent charges of contaminated condensate from a source, such as a pump, into a hold-up zone adapted to maintain a surge supply, with pretreatment, as necessary, to remove any incorporated gaseous material, such as air. A pump or other motive means is provided for the purpose of continuously transferring condensate from the surge or hold-up zone to a coalescing zone. Prior to such pumping, a chemical de-emulsifying agent, preferably an electrolyte, is added in relatively small amount to the condensate, only a few tenths of a percent by weight of the agent being required. Commercial grade calcium chloride has been found effective as an emulsion breaker in a proportion of about 0.2 wt. percent. Simultaneously, calcium or sodium hydroxide and calcium hyprochlorite also may be added for pH adjustment and chlorination of the water, if needed.

These chemical agents may be added to the accumulated body of fluid condensate at any convenient location in the zone of fluid hold-up. They may be added in the bottom region of the surge tank or they may be injected directly into the transfer line between the surge tank and the coalescer, preferably near the inlet side of the pump or other motive means, so that complete distribution of the chemical agent may be effected throughout the condensate before it reaches the coalescer. Time considerations for effecting fluid transfer between the surge supply tank and the coalescer may influence the selection of a most suitable point for introduction of the chemical agent or agents, since a chemical reaction is involved, and de-emulsification should be well under way before the condensate reaches the coalescing zone.

While the method according to the present invention involves the use of a condensate surge or hold-up zone, in order to achieve continuous operation of the treating section of the system, the method as disclosed in the aforementioned U.S. Patent No. 3,363,399 involves a batch operation.

The emulsion containing the heavier lubricant and some precipitated heavy lubricant passes into a coalescer where all the undissolved heavy lubricant is coalesced and stripped out of the emulsion. The coalesced mixture separates into a heavier, recoverable lubricant phase and a lighter, contaminated waste water phase. The lubricant and contaminated water phases are separately withdrawn from a separating zone, the contaminated water being passed through an adsorbing zone to remove the contaminant phenolic compounds. The resultant purified water may then be disposed of safely.

Lubricant passes from the separating zone into a water stripper. Lubricant obtained from the stripper is then sent to a storage area for recovery. If desired, however, the lubricant obtained from the stripper may be passed through an adsorber or an adsorber system for further purification before storage.

After treatment in the coalescer, the lubricant draw-off streams may be sent to waste or may be treated for recovery of the lubricant. While treatment of the sludge withdrawn from the receiving zone of the coalescer may not be economically feasible, the separating zone may yield sufficient lubricant to warrant recovery, as by treatment with alumina, fuller's earth, etc.

The contaminated water fraction withdrawn from the coalescer may be treated for removal of the dissolved phenols by being passed through a bed of adsorbent material, such as activated carbon. For uninterrupted operation, two adsorbers are provided, connected in series flow arrangement. The discharge line of each adsorber is provided with liquid draw-off taps for periodic testing to determine the degree of contamination of the water leaving the respective adsorber vessel. Testing of the water withdrawn from the tap at the bottom of the first adsorber will show when the adsorbent material in the first adsorber is spent, as indicated by the presence of phenol in the draw-off water. At such time, the first adsorber may be cut out temporarily while the bed of activated carbon or other adsorbent is regenerated or replaced with fresh material. During this period the second adsorber will function alone. After the first adsorber is re-charged, it may be placed back in service as the second adsorber in the series flow arrangement. This is readily accomplished by standard valve and switching devices. Water may be withdrawn periodically, such as daily, from the current second adsorber and tested to determine whether it meets the desired or required tolerable contamination limits.

For a fuller understanding of the invention, reference may be had to the following specification and claims taken in connection with the accompanying drawing forming a part of this application and diagrammatically illustrating as one embodiment of the invention a complete system for treating an air compressor condensate comprising water contaminated with an extremely small amount of a compressor lubricant which has a specific gravity greater than that of the water, such as triaryl phosphate.

Referring to the drawing, the air compressor condensate, an aqueous emulsion of triaryl phosphate, petroleum based lubricants, rust, scale, atmospheric dust and other atmospheric contaminants, enters pre-separator 112 from conduit line 111. Air is separated from the emulsion in known manner and released from the top of pre-separator 112 through conduit line 113.

Substantially degassed fluid condensate is withdrawn from the bottom of pre-separator 112 through conduit 114 and enters surge or hold-up tank 115, which may be vented by means of line 116. After a sufficient or predetermined level of condensate has been obtained in hold-up tank 115, transfer pump 117 is energized manually or automatically. Simultaneous with the activation of the pump or earlier, chemicals such as calcium chloride, calcium hypochlorite, and calcium or sodium hydroxide, which have been placed in solution with water in mix tank 118, are passed by force of gravity or by known pump or eduction means (not shown) into the body or stream of condensate constituting the surge supply. Thus, the condensate may be introduced into the bottom region of hold-up tank 115, as by valved conduit 119, or it may be introduced into condensate transfer line 120, as by conduit 119 and valved conduit 119', which convey the surge condensate to the suction side of pump 117. Desirably, the solution is introduced as close to the pump as may be practicable. For most efficient operation it is necessary that the chemical agent or agents be well distributed throughout the body of condensate before the latter reaches the coalescer. Agitation of the mixture in passing through the pump 117 and the conduit 123 connecting the pump to the coalescer will normally achieve the desired mixing or distribution.

As the condensate passes from the hold-up tank 115 to the pump 117, sludge separated from the treated condensate in the coalescer is introduced as recycle into the transfer line 120. Dependent upon the selected respective points of introduction, this may occur either before or after the chemical agents are added to the condensate. In the illustrated embodiment, the recycle sludge is introduced ahead of the chemical agents, as by line 121.

A filter 122 in conduit line 123 may be provided for the purpose of removing foreign particles as well as insuring adequate contact between components of the emulsion and the flock formed as the result of the chemical addition. However, if solid sediments are negligible filter 122 may be by-passed.

The mixture in line 123 is then introduced into coalescer 124. A valved vent line 125 is provided at the top of the coalescer to permit the discharge of gaseous materials. The heavy sludge which is collected on a lower support sheet inside the coalescer may be recycled through valved conduit line 121 for admixture with condensate from hold-up tank 115 or may be discarded through valved conduit line 126. The lighter liquid, a mixture primarily of water and organic lubricant, passes through cartridges inside the coalescer where it is filtered and then leaves the coalescer by means of conduit line 127 and enters separator vessel 128.

In separator vessel 128 the heavy organic lubricant settles to the bottom while the lighter water rises to the top. Valved vent line 129 is provided at the top of the vessel to permit the discharge of gaseous materials. The water layer in separator 128 is passed through conduit 130 to absorbers, such as those shown in said application Ser. No. 592,699, for the removal of phenol and other organic impurities to obtain disposable water. The heavy organic lubricant layer is removed from the bottom of separator 128 by conduit line 131 and sent to water stripper 132 which reduces the water content to less than about 0.2 wt. percent.

Dry air introduced into the water stripper by line 133 passed upwardly through the stripper picking up water as the organic lubricant flows downward over packing material, such as steel chips, steel wool, or Raschig rings, and leaves through valved line 134.

If the water content of the lubricant leaving the stripper though conduit line 135 is sufficiently high to justify the expense of an adsorber, the lubricant is introduced into adsorber 138. The function of this adsorber may be enhanced by the use of a heater (not shown) to warm the incoming fluid. Alumina, fuller's earth or other suitable material may be used in the adsorber.

Organic lubricant directly from the water stripper (through lines 135 and 136) or from the optional adsorber passes through conduit line 137, a final filter 139 and then through conduit line 140 into storage vessel 141. For each 3000 gallons of condensate processed, approximately 6 gallons of reusable lubricant may be recovered.

Since the specific gravity of some synthetic lubricants is very close to that of water, there is a tendency for small droplets of lubricant to be carried along with the water to the adsorbers in conduit line 130. To avoid this, a cyclone separator, diagrammatically shown at 130' may optionally be utilized to separate these droplets from the water leaving separator 128. Lubricant discharging from the cyclone separator may either be reintroduced into the main lubricant stream 131 or may be drained periodically from the cyclone separator and discarded.

Thus, a complete system for oil and water separation and purification is provided by the present invention wherein valuable components may be recovered and water is conditioned for acceptance by normally available waste disposal means. Even in those instances where the recovery of compressor lubricants is not desired, it is more convenient and less expensive to dispose of several gallons of used lubricant safely than to dispose of several thousand gallons of contaminated condensate.

Obviously, many modifications and variations of the invention as hereinbefore set forth may be made without departing from the spirit and scope thereof, and therefore only such limitations should be imposed as are indicated in the appended claims.

What is claimed is:

1. The method of treating water contaminated with oil heavier than water and with water-soluble components, which comprises:
    (a) de-aerating said contaminated water;
    (b) collecting intermittent charges of the de-gassified, contaminated water and maintaining a supply thereof in a single hold-up tank;
    (c) continuously discharging said contaminated water from said hold-up tank and passing the same through a conduit to a coalescing zone;
    (d) injecting a de-emulsifier into said contaminated water at a point intermediate the middle of said hold-up tank and said coalescing zone;
    (e) passing said contaminated water into a coalescer and therein separating said contaminated water into a first, heavier portion mainly comprising sludge, and a second, lighter portion mainly comprising oil and water;
    (f) passing said second lighter portion into a settling zone and therein separating said second, lighter portion into a heavier portion mainly comprising oil, and a lighter portion mainly comprising water; and
    (g) stripping said separated oil to remove residual water whereby said oil is reusable as a lubricant.

2. The method as in claim 1, including the step of filtering said first, heavier sludge portion separated within said coalescing zone, and then recycling at least a portion of the sludge filtrate to the contaminated water passing to said coalescing zone.

3. The method as in claim 1, including the step of adsorbing water-soluble components from said separated lighter portion mainly comprising water.

4. The method as in claim 3, including the step of removing any entrained droplets of oil from said separated lighter portion mainly comprising water, prior to said step of adsorbing water-soluble components.

5. The method as in claim 4, in which said step of removing entrained droplets of oil is effected by centrifugal separation.

6. A system for treating water contaminated with oil heavier than water and with water-soluble components, comprising:
    (a) means for de-aerating said contaminated water;
    (b) a hold-up tank for collecting intermittent charges of the de-gassified, contaminated water into a single body of liquid forming a surge supply;
    (c) a coalescing chamber;
    (d) a conduit for continuously transporting surge supply of said contaminated water from said hold-up tank to said coalescing chamber;
    (e) means for injecting a de-emulsifier into said surge supply of contaminated water at an intermediate point between the middle of said hold-up tank and said coalescing chamber, said coalescing chamber being adapted to separate the de-emulsified, contaminated water into a first, heavier portion mainly mainly comprising sludge, and a second, lighter portion mainly comprising oil and water;
    (f) a settling chamber;
    (g) means for transporting said second, lighter, oil and water portion from said coalescing chamber to said settling chamber, said settling chamber being adapted to separate said oil-and-water portion into a heavier portion mainly comprising oil and a lighter portion mainly comprising water; and
    (h) means for stripping said heavier, separated oil portion to remove residual water, thereby conditioning said oil for reuse.

7. A system as in claim 6, including adsorber means for adsorbing said water-soluble components from said lighter, separated water portion.

8. A system as in claim 7, including a centrifugal separator for treating said lighter, separated water portion in transit from said settling chamber to said adsorber means so as to remove entrained droplets of oil.

9. A system as in claim 6, including means for filtering said heavier sludge portion and means for recycling sludge filtrate to said surge supply.

10. A system as in claim 9, in which said sludge recycle means is arranged to introduce said sludge into said surge supply conduit between said hold-up tank and said coalescing chamber.

11. A system as in claim 9, in which said de-emulsifier injecting means is arranged to inject said de-emulsifier into said surge supply conduit at a point downstream from the point for introducing recycle sludge.

12. A system as in claim 11, including a pump in said surge supply conduit adjacently downstream from said point for introducing said de-emulsifier.

References Cited

UNITED STATES PATENTS 2,457,959    1/1949    Walker _____ 55—125
2,730,190    1/1956    Brown et al. _____ 55—45

SAMIH N. ZOHARNA, *Primary Examiner.*

C. N. HART, *Assistant Examiner.*

U.S. Cl. X.R.

55—171